US007082368B2

(12) United States Patent
Nickel

(10) Patent No.: US 7,082,368 B2
(45) Date of Patent: Jul. 25, 2006

(54) SEISMIC EVENT CORRELATION AND $V_P$-$V_S$ ESTIMATION

(75) Inventor: Michael Nickel, Stavanger (NO)

(73) Assignee: Schlumberger Technology Corporation, Ridgefield, CT (US)

(*) Notice: Subject to any disclaimer, the term of this patent is extended or adjusted under 35 U.S.C. 154(b) by 187 days.

(21) Appl. No.: 10/861,054

(22) Filed: Jun. 4, 2004

(65) Prior Publication Data

US 2005/0273266 A1    Dec. 8, 2005

(51) Int. Cl.
*G01V 1/28* (2006.01)

(52) U.S. Cl. ...................................... 702/17
(58) Field of Classification Search ................ 702/14, 702/17, 18; 367/73
See application file for complete search history.

(56) References Cited

U.S. PATENT DOCUMENTS

| | | | | |
|---|---|---|---|---|
| 4,686,657 | A | 8/1987 | Dellinger et al. | 367/75 |
| 5,132,938 | A * | 7/1992 | Walters | 367/38 |
| 6,574,563 | B1 * | 6/2003 | Nickel | 702/14 |
| 6,640,190 | B1 | 10/2003 | Nickel | 702/14 |
| 6,757,217 | B1 * | 6/2004 | Eastwood et al. | 367/52 |

OTHER PUBLICATIONS

DeAngelo et al. *Depth Registration of P-wave and C-wave Seismic Data for Shallow Marine Sediment Characterization, Gulf of Mexico.* The Leading Edge—Interpreter's Corner (Feb. 2003) pp. 97-105.
Fomel, Sergey and Backus, Milo M. *Multicomponent Seismic Data Registration by Least Squares.* SEG Int'l Exposition and Seventy-Third Annual Meeting (2003) pp. 781-784.
Gaiser, James E. *Multicomponent $V_p/V_s$ Correlation Analysis.* Geophysics. vol. 61, No. 4 (Jul.-Aug. 1996) pp. 1137-1149.
Kaaresen, Kjetil F, and Taxt, Tofinn. *Multichannel Blind Deconvolution of Seismic Signals.* Geophysics, vol. 63, No. 6 (Nov.-Dec. 1998), pp. 2093-2107.
Mémin, Etienne and Pérez, Patrick. *Dense Estimation and Object-Based Segmentation of the Optical Flow with Robust Techniques.* IEEE Trans. on Image Processing, vol. 7, No. 5 (May 1998) pp. 703-719.
Van Dok, Richard and Kristiansen, Pal. *Event Registration and $V_p/V_s$ Correlation Analysis in 4C Processing.* SEG Int'l Exposition and Seventy-Third Annual Meeting (2003) pp. 785-788.

* cited by examiner

*Primary Examiner*—Donald McElheny, Jr.
(74) *Attorney, Agent, or Firm*—William B. Batzer; Jody Lynn DeStefanis; Dale Gaudier

(57) ABSTRACT

A method of correlating seismic events associated with different types of seismic transmission modes and includes calculating a shift estimate between a first set of seismic events or attributes associated with the seismic events attributable to one type of transmission mode and a second set of seismic events or attributes associated with the seismic events attributable to a different type of transmission mode using a smoothed version of at least one of the sets of seismic events or attributes associated with the seismic events, and updating the shift estimate using a less severely smoothed or unsmoothed version of the at least one set of seismic events or attributes associated with the seismic events. A related computer system and computer program products associated with the method are also described.

19 Claims, 14 Drawing Sheets

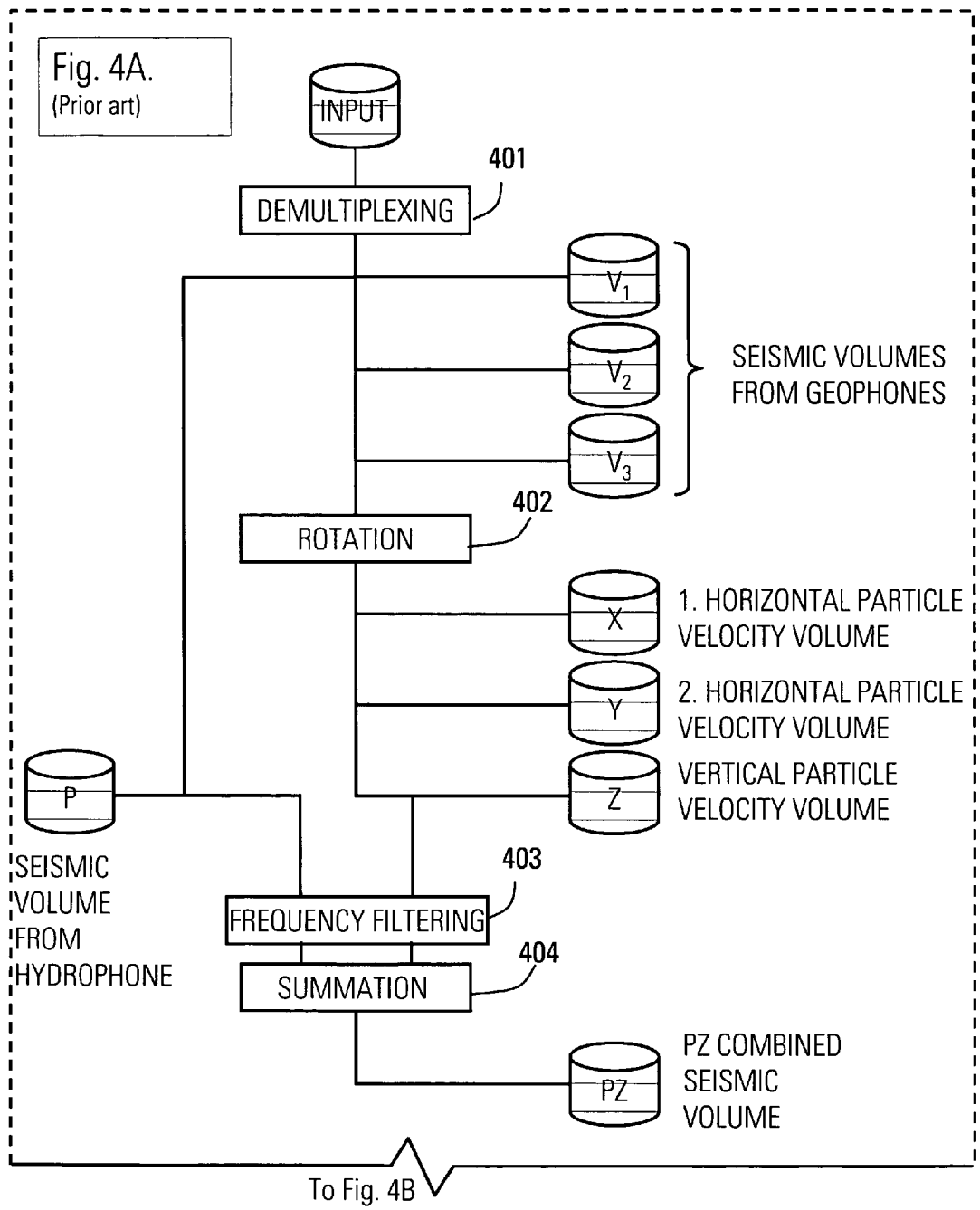

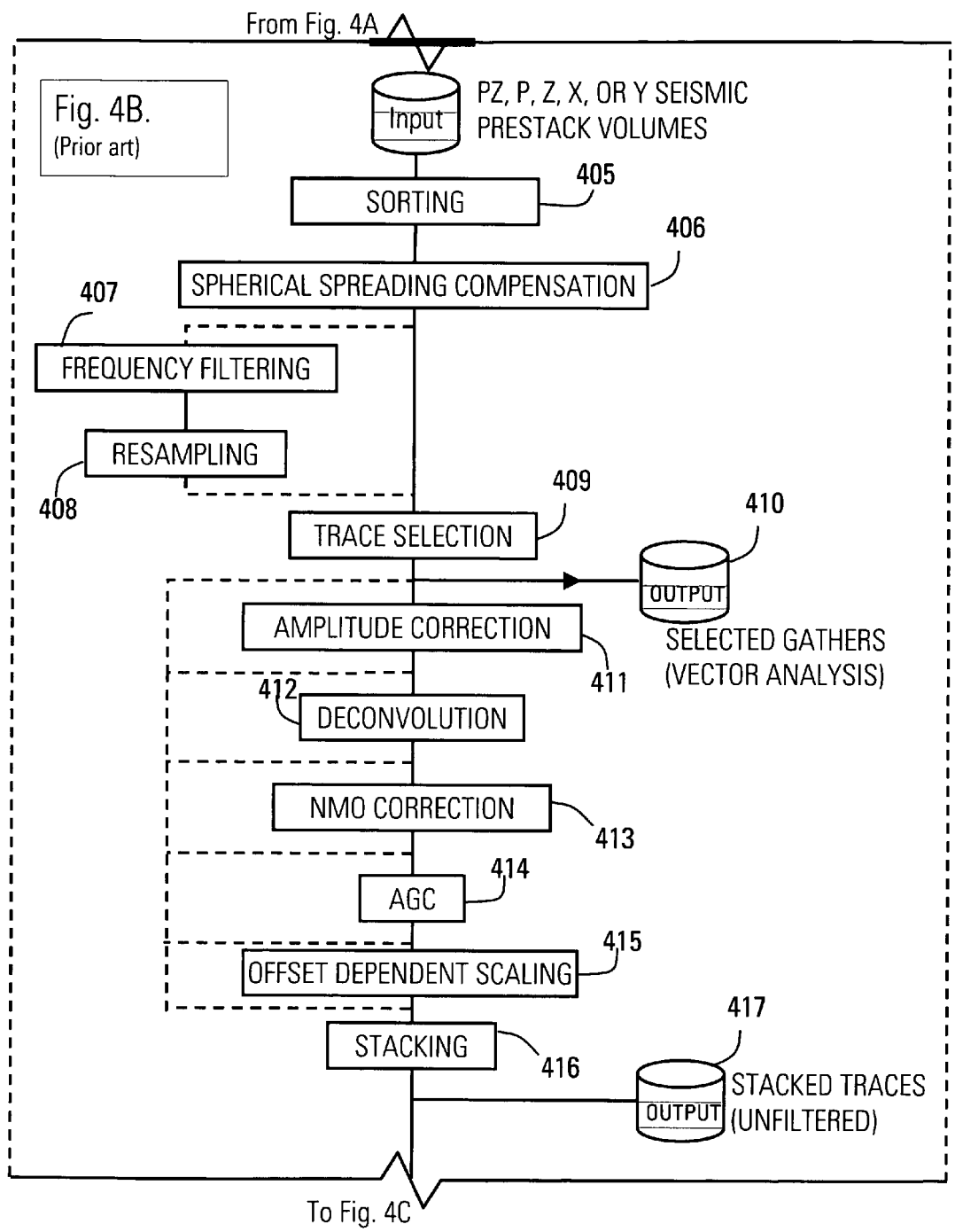

SEISMIC EVENT CORRELATION AND $V_P$-$V_S$ ESTIMATION

RELATED APPLICATION

This application is related to commonly assigned U.S. Pat. No. 6,640,190 entitled "Estimating subsurface subsidence and compaction", incorporated herein by reference.

FIELD OF THE INVENTION

The present invention relates generally to apparatus and methods for processing multi-component seismic data signals of the subsurface and characterization thereof, and in particular to apparatus and methods that correlate seismic events associated with different types of seismic transmission modes.

BACKGROUND OF THE INVENTION

Seismic imaging plays an important role in the study of underground formations, and in particular in the study of underground formations that are related to subsurface reservoirs containing e.g. fresh water, gas hydrates or hydrocarbons.

One way of acquiring seismic data is by disposing a plurality of sensors on the earth's surface. These sensors may be disposed on land, on the seabed, or in a land/sea transition zone. Furthermore by deploying sensors that measure the particle velocity in three orthogonal directions as well as the local pressure variations of an elastic wave phenomenon passing the sensors so called multi-component seismic data can be acquired. The elastic wave phenomenon is commonly generated by a firing a pressure source gun at the sea-surface or by vibrating the earth with a large mass.

By monitoring the seismic energy reflected from underground formations with the multi-component sensor network, information on the underground itself can be deduced. One specific benefit of multi-component seismic measurements is that it holds more information about the underground formations than so-called conventional seismic that measures only one component.

In a marine exploration setting, two modes of seismic waves are typically considered:
1. Seismic energy that propagates as a longitudinal (or pressure) wave from the source into the underground; where it is reflected at a formation and then travels again as longitudinal wave to the sensor network. This mode is also denoted as PP mode.
2. Seismic energy that propagates as a longitudinal (or pressure) wave from the source into the underground; where it is reflected and converted to a transversal (or shear) wave mode and propagates as this to the sensor network. This mode is also denoted as PS mode.

Since the propagation velocity is different for the longitudinal wave mode and each of the two possible transversal wave modes, a reflecting formation in the subsurface is recorded at different times at the sensor network depending on the mode. Furthermore, the amplitudes of the recordings are different since a reflection of a pressure wave is governed in another way than the reflection and conversion of a pressure mode into a shear mode.

Conventionally, the acquired PP and PS seismic data are subjected to separate processing sequences, each addressing the special nature of its mode. To those acquainted in the art of seismic processing it is clear that the outcome is typically a time-migrated PP and a time-migrated PS image volume of the underground where the vertical (depth) axis of the image volume is denoted in recording time rather than in real depth measured in meters or feet.

In order to facilitate a joint analysis of the PP and PS seismic image volumes, these data have to be transferred to a common domain in a further processing step.

Typically the PS seismic image volume is stretched vertically to the time scale of the PP seismic image volume by a process of event correlation. A state of the art embodiment of this process consists of:
1. Interpreting a first set of horizons on the PP seismic image volume.
2. Interpreting a second set of horizons on the PS seismic image volume where each horizon of the second set corresponds to the same reflecting subsurface event identified as the corresponding horizon in the first set.
3. Stretching the PS image volume to PP time scale by displacing samples at the location of the PS horizons to the location of their corresponding PP horizons. The samples at locations in between two PS horizons are displaced by an amount found by interpolating the displacement between the horizon locations.

The above procedure of event correlation has a number of disadvantages. It is work intensive since an interpretation of this kind has to be produced by a highly skilled person who identifies the same reflecting event in both PP and PS data. Thus it may involve a considerable manual effort. Furthermore since the event correlation is only based on seismic data at the location of the interpreted horizons only a part of the available information is exploited. Finally, the time interval in between two neighboring horizons is commonly rather large and interpolation of the displacement at intermediate positions becomes inaccurate. It should also be noted that although the word "stretching" is used here and throughout the application, this process can alternatively be thought of as "squeezing" because shear transmission mode velocities are typically lower than compressional transmission mode velocities.

To overcome some of these disadvantages Fomel (see Fomel, S. and Backus, M., 2003, Multicomponent seismic data registration by least squares, 73rd Ann. Internat. Mtg.: Soc. of Expl. Geophys., 781–784) recently proposed a scheme to automatically refine a displacement estimate obtained by manual event correlation applying a warping scheme on the seismic signal. The method is used to generate a high-resolution $v_p$–$v_s$ ratio estimate. It has however some crucial deficiencies that will lead to non-robust results for typical real data cases. First of all, in addition to the time difference between corresponding PS and PP samples also an amplitude-scaling factor between said samples is estimated. Though this amplitude-scaling factor in general reflects the physical differences between the PP and PS seismic reflectivity, its particular implementation renders the algorithm less robust. In principle, it is possible to apply only amplitude scaling in order to transfer a PS seismic to the PP seismic i.e. without displacing the PS seismic along the time-axis. Consequently the inversion to two variables i.e. the amplitude scaling and the displacement along the time axis is non-unique and leads to robustness problems in the algorithm. Fomel recognizes this and states that "to avoid being trapped in a local minimum the method needs a good initial guess for the warping function w(t)". Furthermore, Fomel's method operates only on individual signals and thus does not exploit the lateral correlation inherent in seismic data.

Kristiansen et al. (see Kristiansen, P. and Van Dok, R., 2003, Event registration and Vp/Vs correlation analysis in 4C processing, 73rd Ann. Internat. Mtg.: Soc. of Expl. Geophys., 785–788) proposed an alternative scheme to arrive at a high-resolution $v_p$–$v_s$ ratio estimate by scanning over possible $v_p$–$v_s$ ratios and picking local maxima in a semblance panel. Yet, as with Fomel's method, an initial $v_p$–$v_s$ ratio estimate produced by manual interpretation is needed.

The present invention overcomes the deficiencies with the present methods and produces a high-resolution $v_p$–$v_s$ ratio estimate without the need of manual interpretation.

Accordingly, it is an object of the present invention to provide an improved method of correlating seismic events associated with different types of seismic transmission modes and for deriving and using information resulting from such correlations, such as estimates of $v_p$–$v_s$ ratios.

SUMMARY OF THE INVENTION

The present invention involves a method of correlating seismic events associated with different types of seismic transmission modes and includes calculating a shift estimate between a first set of seismic events or attributes associated with the seismic events attributable to one type of transmission mode and a second set of seismic events or attributes associated with the seismic events attributable to a different type of transmission mode using a smoothed version of at least one of the sets of seismic events or attributes associated with the seismic events, and updating the shift estimate using a less severely smoothed or unsmoothed version of the at least one set of seismic events or attributes associated with the seismic events.

In one embodiment of the present invention, a novel method and system of geophysical exploration is provided that uses a multi-attribute, multi-resolution matching approach to stretch a PS seismic volume to its corresponding PP seismic time scale in order to facilitate a joint analysis of the dataset. The geophysical exploration method includes multi-component seismic data pre-processing and reservoir analysis of said multi-component data.

In a further embodiment, multi-component seismic data are acquired by deploying (either permanently or temporarily) a seismic sensor network at the earth's surface or at the sea surface and recording the seismic energy that is imparted into the earth subsurface and reflected from different subsurface formations. The acquired seismic data are processed according to state of the art processing sequences for multi-component data resulting in PP and PS seismic volumes in their respective time scales. A multi-attribute, multi-resolution matching approach is applied in order to stretch the PS seismic volume to the time scale of the PP seismic volume.

In another embodiment, multi-component seismic data are acquired and processed using state of the art processing sequences to produce PP and PS seismic volumes in their respective time scales. A multi-attribute, multi-resolution matching approach is applied in order to stretch the PS seismic volume to the time scale of the PP seismic volume. Furthermore, a $v_p$–$v_s$ ratio volume is derived from the knowledge about the amount of stretch that is necessary to match the different time scales. Such a $v_p$–$v_s$ ratio volume is of particular interest for the task of characterizing the lithology and/or fluid content of different subsurface formations.

In yet another embodiment, multi-component seismic data are acquired and processed accordingly to produce two PS seismic volumes, one associated with the fast moving shear wave mode the other associated with the orthogonal slowly moving shear wave mode. A multi-attribute, multi-resolution matching approach is applied in order to stretch the PS seismic volume representing slowly moving shear mode to the PS seismic volume representing fast moving shear mode. The information about the amount of stretch is further inverted into a $v_{s,fast}$–$v_{s,slow}$ ratio volume. Such a $v_{s,fast}$–$v_{s,slow}$ ratio volume is useful in characterizing subsurface formations and in particular subsurface formations that exhibit a significant amount of faults and fractures.

In a further embodiment, a multi-component seismic sensor network is permanently or temporarily laid out at selected locations at or close to the earth's surface or at the seabottom in a marine environment in order to acquire one or several seismic surveys of compressional wave (PP) data and compressional to shear or shear to compressional wave (PS) data. Seismic energy is transmitted into the earth's subsurface interacts with subsurface formations and is reflected towards and recorded at said seismic sensor network.

In an additional embodiment, depth migrated volumes or attributes derived from depth migrated volumes are used and the shift estimate is measured in distance rather than time.

Features of the invention, preferred embodiments and variants thereof, possible applications and their advantages will become appreciated and understood by those skilled in the art from the following detailed description and drawings.

BRIEF DESCRIPTION OF THE DRAWINGS

FIGS. 4A, 4B, and 4C show a process flow diagram of a typical processing sequence to reduce multi-component seismic data;

DETAILED DESCRIPTION

Figure 1:
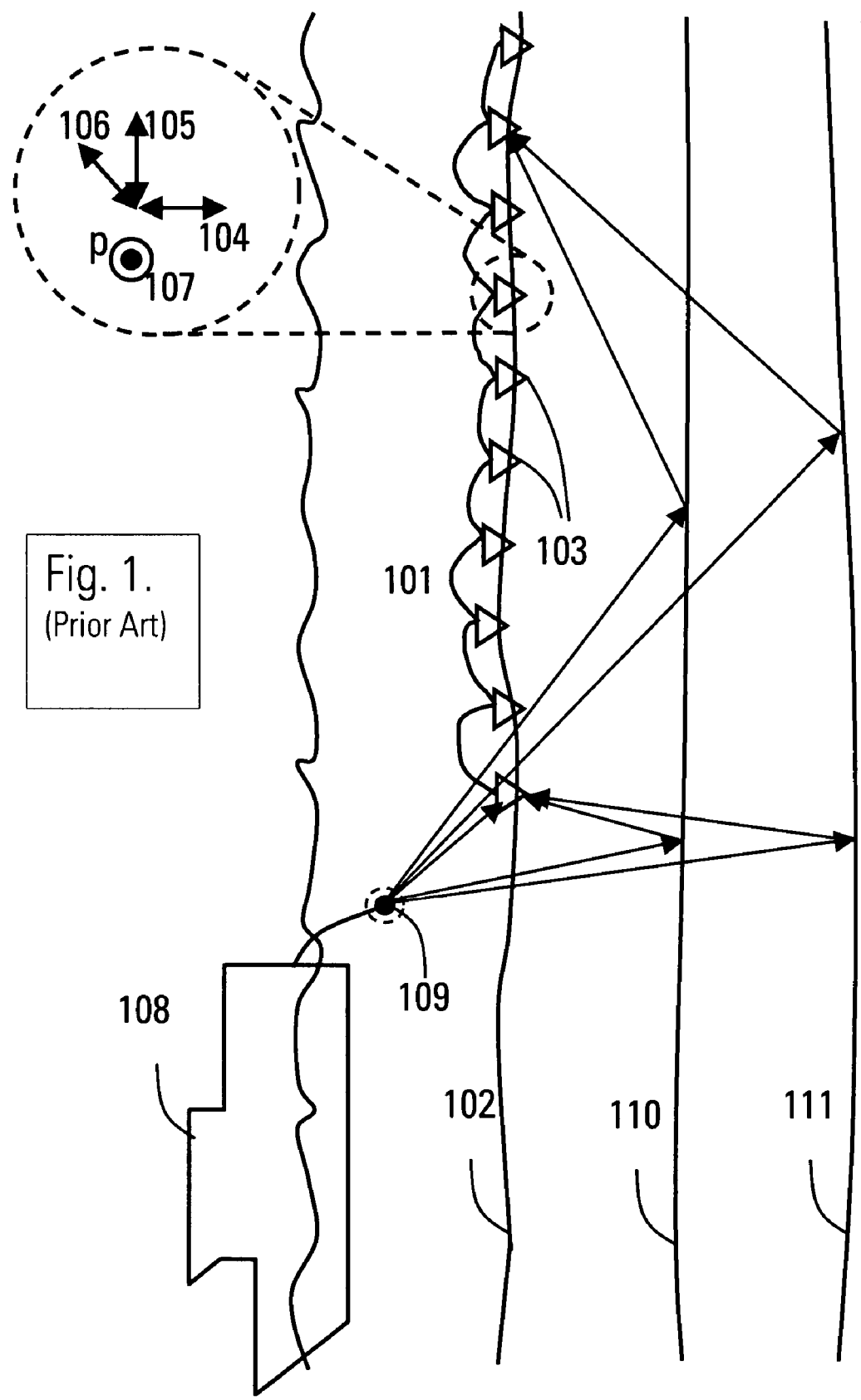
FIG. 1 is a schematic diagram of the process of obtaining seismic multi-component data signals from a subsurface area in a marine environment.

FIG. 1 shows a typical survey configuration for obtaining multi-component seismic data signals in a marine environment. A seismic array 101 is laid out on the seabottom 102 or entrenched into the seabottom. The seismic array contains a plurality of multi-component sensors 103. A multi-component sensor 103 is composed of three geophones 104, 105, and 106, measuring the particle velocity at the seabottom in three orthogonal directions as well as a hydrophone 107 measuring the pressure at the seabottom.

A seismic survey vessel 108 is used to tow a seismic source, such as a single or a group of airguns 109. The airguns produce a series of acoustic pulses, which propagate through the water layer and into the underground and which are partially reflected by boundaries 110 and 111 between the geologic layers that have differing elastic properties. The seismic array senses the reflected elastic wavefield at the seabottom and transmits the seismic data signals, also referred to as seismic traces, to the seismic survey vessel, where they are recorded.

Often the seismic array is arranged in form of a seabed cable and typically two such seabed cables are laid out in parallel and a three dimensional set of seismic data signals will be obtained by positioning the source within a chosen area (typically larger than the area defined by the two seabed cables). The process shown in FIG. 1 is well known in the art and, in and of itself, forms no part of the present invention. Further, although the exemplified embodiment of the current invention relates to marine multi-component seismic surveying, it is to be understood that this is not a limitation of the invention.

Figure 2:
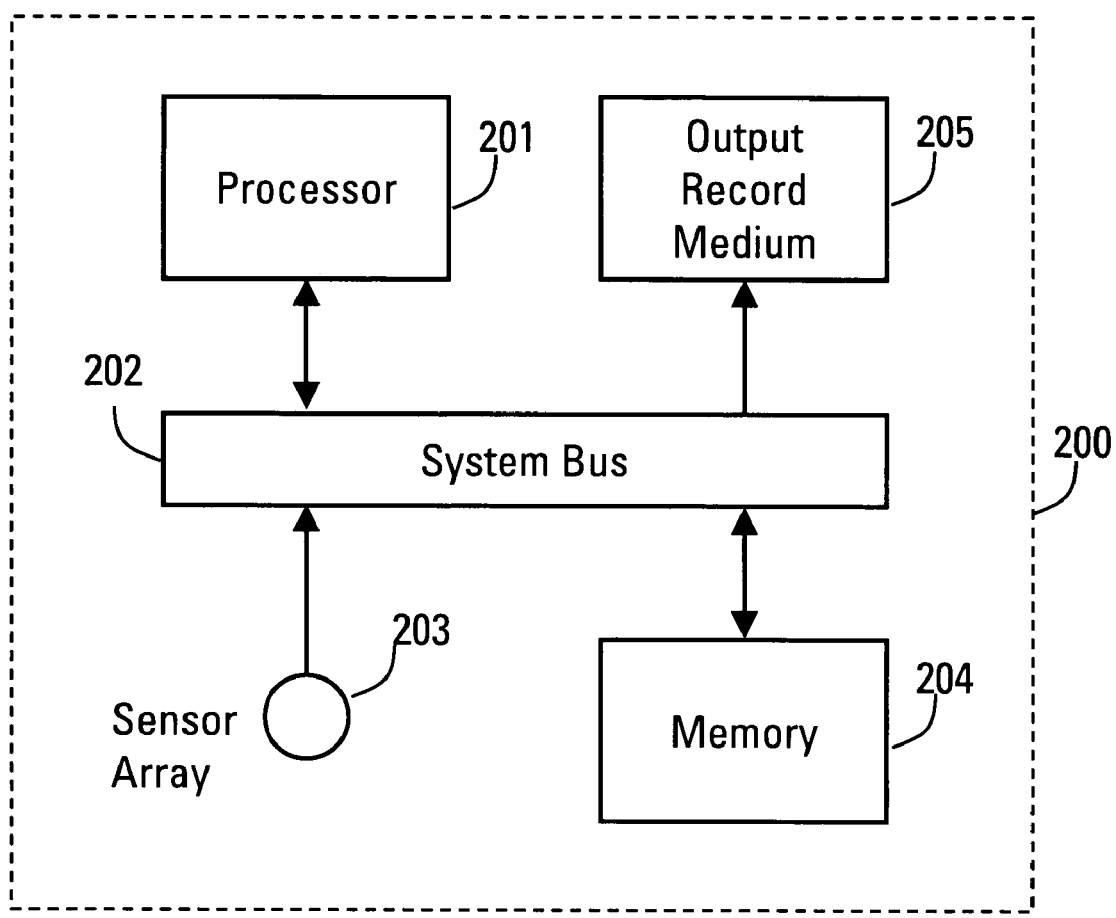
FIG. 2 is a block diagram of a seismic data acquisition system.

Referring now to FIG. 2, there is provided a diagram showing a recording system 200 for seismic signals in accordance with a preferred embodiment of the present invention. The recording system 200 is composed of a processor 201 connected to a system bus 202. Processor 201 receives seismic data signals from the multi-component seismic array 203 (101 with reference to FIG. 1) via the system bus 202. The processor 201 will perform low-level signal processing, for example noise reduction. The recorded seismic data volume may be stored on the memory 204 in digital form before transferring it to an output medium 205, which may, for instance, be a magnetic tape, optical disks, or a (wireless) network.

Figure 3:
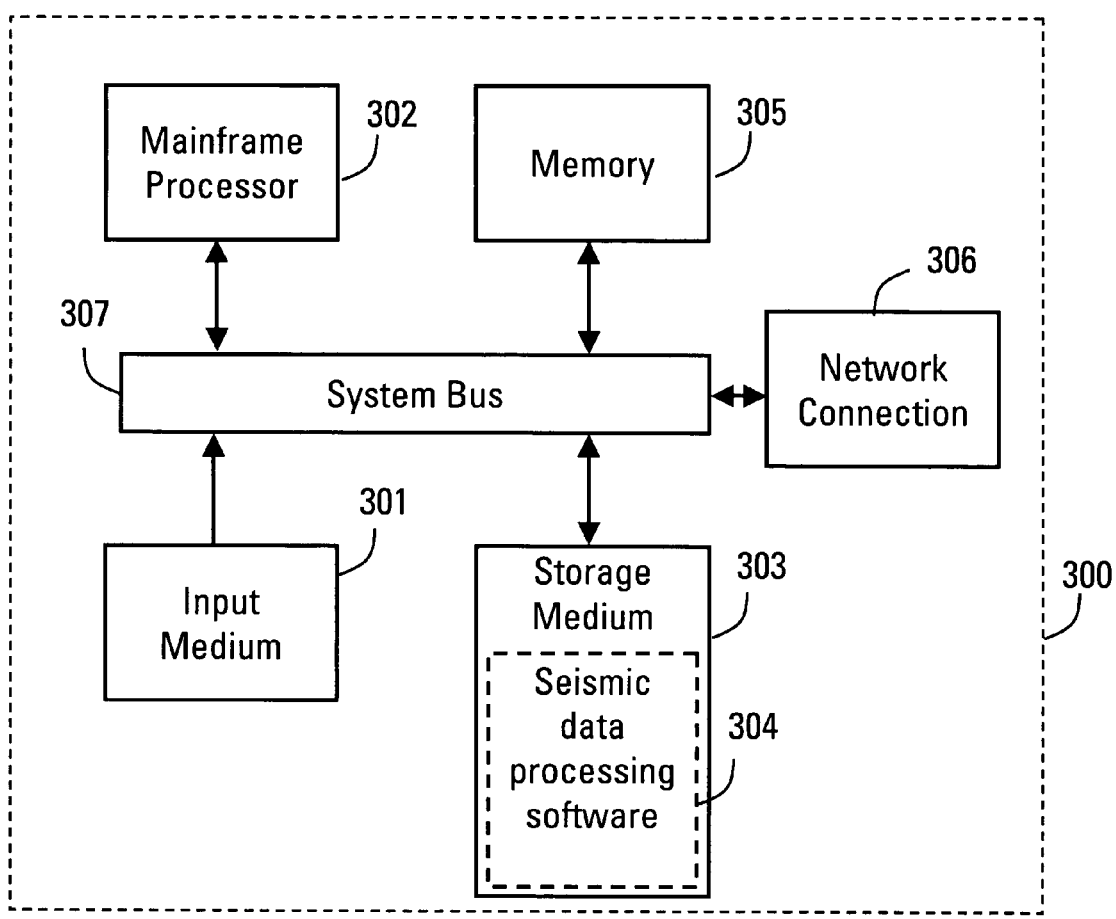
FIG. 3 is a block diagram of a seismic data processing and reduction mainframe computer system.

In a next step, the seismic data volume will typically be uploaded to a processing system 300 that may, in accordance with the present invention, have a configuration as shown in FIG. 3. An input medium 301, a mainframe processor (or processor cluster) 302, a storage medium 303 holding processing software 304, memory 305 to store data, and a network access medium 306 are connected to a system bus 307. In a typical processing suite, the seismic data volume will be uploaded using the input medium 301 and stored in the memory 305. The mainframe processor 302 will perform several operations on the seismic data in order to enhance and reduce these data. The processing sequence can be adapted in order to optimize the output by choosing operators for data processing from a library stored on medium 303.

Figure 4C:
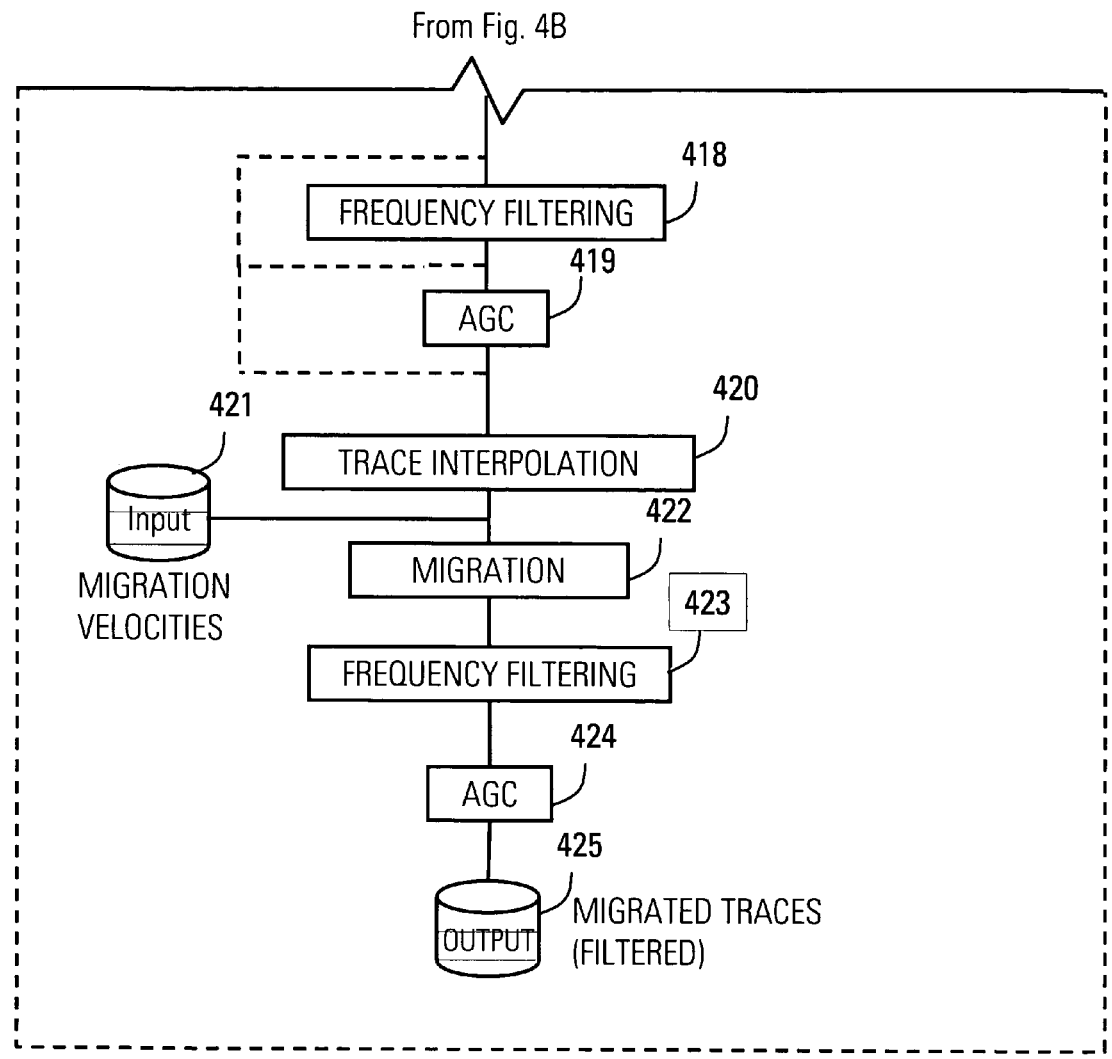
Figure 5:
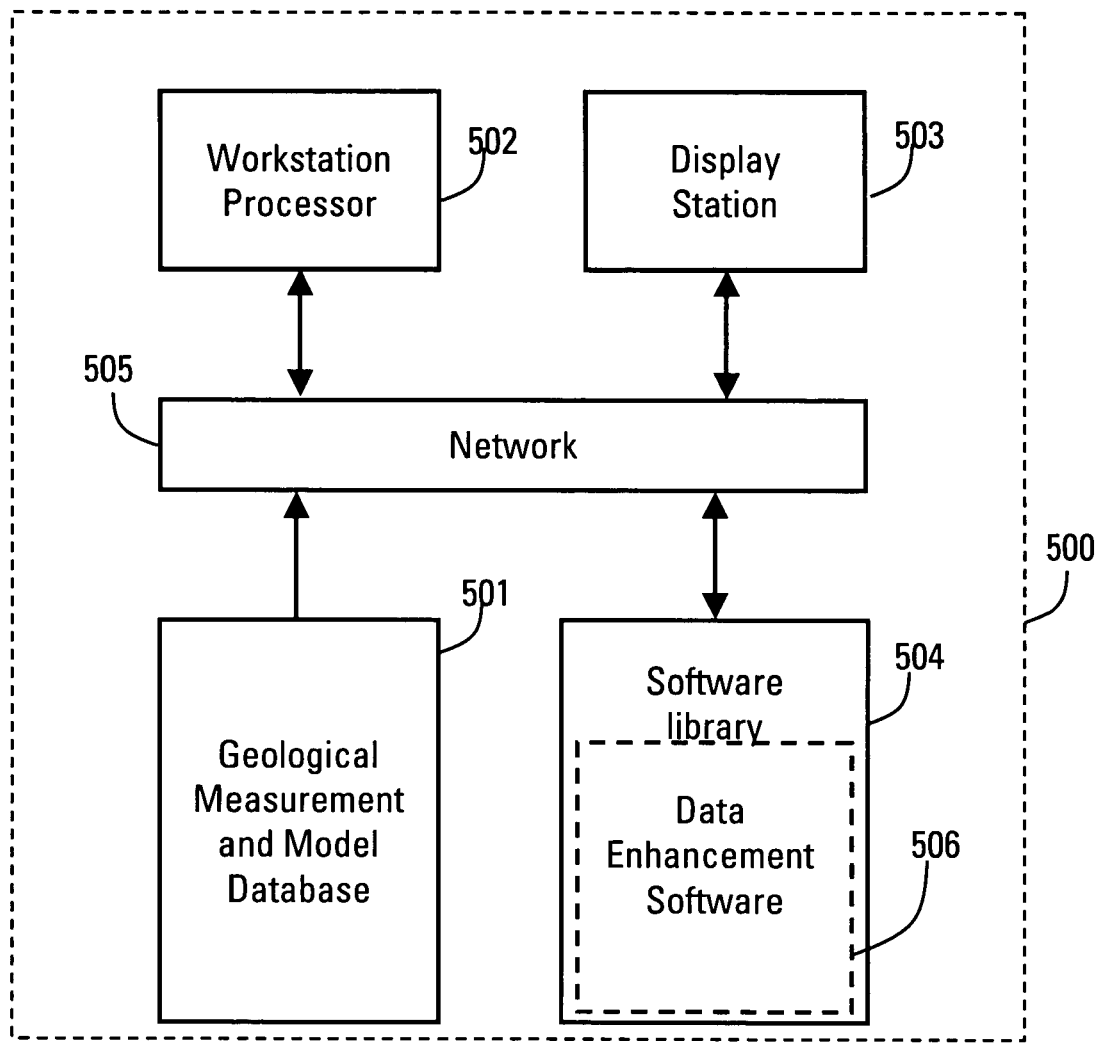
FIG. 5 illustrates a workstation and display used to refine and analyze processed seismic data.

A typical processing sequence representing prior art techniques but in accordance with the current invention where the processing operators were picked from a library residing in 303 is shown as a flowchart in FIGS. 4A, 4B, and 4C. In FIGS. 4A, 4B, and 4C the flowchart of the processing sequence includes the following blocks: a demultiplexing block 401 connected to the input that separates the seismic data into its four components, i.e. the hydrophone and the three orthogonal geophone measurements, a rotation block 402, which performs a vector rotation of the geophone components into three new, orthogonal components, where the so-called Z component is aligned with the vertical direction and the horizontal so-called X component is aligned with the vertical plane defined by the shot point and receiver point, and the second horizontal so-called Y component which is orthogonal to the X and Z component, a frequency filtering block 403 and a summation block 404, Which combines the P and Z component, a sorting block 405, a block for spherical spreading compensation 406, a frequency filtering block 407, a resampling block 408, a trace selection block 409, an output 410 labeled "selected gathers", amplitude correction 411, deconvolution 412, a normal move out correction block 413, an AGC block 414, an offset dependent scaling block 415, a stacking block 416, a second output 417 labeled "stacked traces (unfiltered)", a frequency filtering block 418, another AGC block 419, a trace interpolation block 420, a second input 421 labeled "migration velocities", a migration block 422, a frequency filtering block 423, an AGC block 424, a third output 425 labeled "migrated traces". In the flowchart of FIGS. 4B and 4C, any of the outputs 417 or 425 can typically be used as input to a workstation for estimating the $v_p$–$v_s$ ratio as discussed in detail below.

With reference to FIG. 3, FIG. 4A, FIG. 4B, FIG. 4C, and FIG. 5, the output 410, 417, or 425, of the seismic data processing and reduction sequence will be typically stored in a database 501 holding geological measurements and geological models, and which can be reached from the processing system 300 via a network connection 306. Furthermore, the processing of seismic signal data, as described above and referenced in FIGS. 4B and 4C will be, in accordance with a preferred embodiment of the invention, repeated for each of the components of the produced seismic pre-stack volumes PZ, P, Z, X, or Y.

The database 501 forms part of a data analysis and enhancement system 500, which in addition consists of a workstation processor 502, a display station 503, and a software library 504 holding data enhancement application software 505 and in particular the module 506 to estimate the $v_p$–$v_s$ ratio and to match stretch the PS seismic to the PP time scale which is described in detail below.

Figure 6:
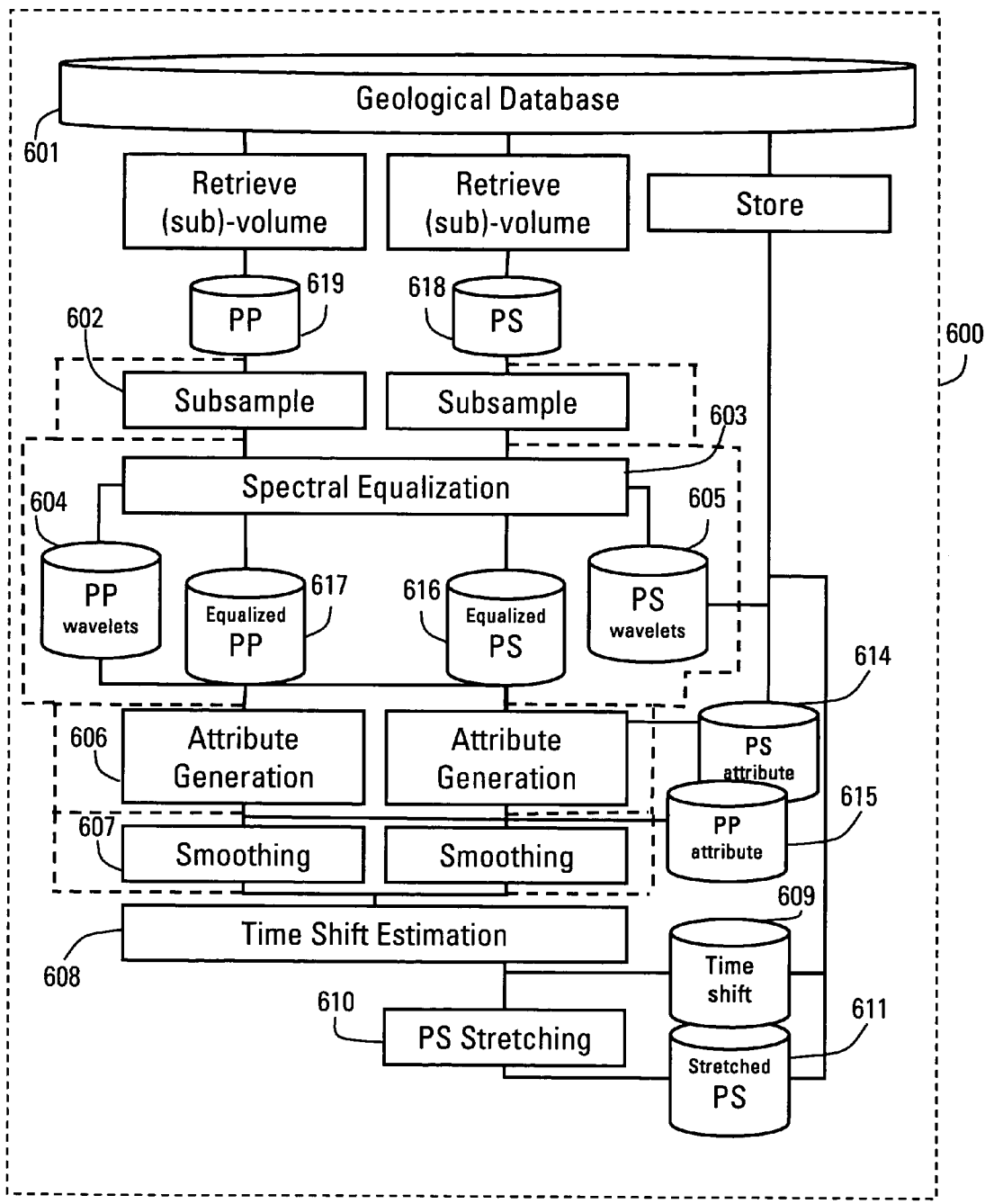
FIG. 6 shows a flow diagram of steps associated with the estimation of a time shift in order to stretch a PS seismic volume from the PS time scale to the PP time scale.

Referring now to FIG. 6, there is provided a flow scheme 600 showing processing steps associated with a preferred embodiment in order to estimate the time shift necessary to stretch the PS seismic volume to the PP seismic time scale in accordance with the present invention.

A 3D seismic data volume referred to as PP, and a corresponding 3D seismic data volume referred to as PS, is retrieved from the geological measurement and model database 601. The PP volume will typically be the PZ seismic volume after the refinement steps detailed in FIGS. 4B and 4C and the PS seismic volume will typically be the seismic volume referred to as X component again after the refinement steps of FIGS. 4B and 4C. In yet another preferred embodiment, the PP seismic volume could be the result of refining either the P or the Z seismic prestack volumes with the processing steps of FIGS. 4B and 4C. In a further embodiment, the PP seismic volume could be the refinement result of a towed streamer seismic acquisition over the same survey area.

In yet another preferred embodiment, the PP seismic volume could be indeed the X component after the refinement steps of FIGS. 4B and 4C in which case the PS seismic volume would be the refinement result of the Y prestack seismic volume. In this special case the invention is used to estimate the ratio between the fast and slow shear wave velocities and to transfer the two volumes to a common time scale.

Now continuing the processing sequence 600, the PP and PS seismic volumes may be subjected to subsampling 602, followed by a spectral equalization step 603. The outputs of this step are equalized PP and PS volumes as well as a sequence of PP spectra or wavelets 604, and PS spectra or wavelets, 605. A preferred embodiment of the spectral equalization step is sketched in FIG. 7 and described in more detail below. The equalized PP and PS volumes may in a next step be subjected to seismic attribute generation.

In particular the formation dip and fault attribute as detailed in Randen et al. (see "Three-Dimensional Texture Attributes for Seismic Data Analysis", Trygve Randen, E. Monsen, C. Signer, A. Abrahamsen, J. O. Hansen, T. Saeter, J. Schlaf, L. Sønneland, In *Extended Abstracts, Society of Exploration Geophysicists Annual Meeting*, Calgary, Canada, August 2000) as well as the envelope of the seismic trace have proven beneficial and are in full compliance with a preferred embodiment of the invention. The produced attributes may be additionally smoothed 607 before subjecting them to time-shift estimation 608. Preferred embodiments of this time-shift estimation are detailed below. The output of step 608 is a time shift volume 609, $T(t_{pp},x,y)$, indicating for each seismic sample position indexed by $(t_{pp},x,y)$ the amount T by which a sample indexed in PS time has to be shifted to be placed at its corresponding PP time, i.e.

$$t_{ps}=t_{pp}+T(t_{pp},x,y).$$

The volume 609 is used to stretch any of the generated output volumes 614 or 616 or the input PS volume 618 to result in a volume that is generally called stretched PS 611, i.e.

$$s_{ps,stretched}(t_{pp},x,y)=s_{ps}(t_{pp}+T(t_{pp},x,y),x,y).$$

where $s_{ps}(t,x,y)$ corresponds to 614, 616, or 618 and $s_{ps,stretched}(t,x,y)$ corresponds to 611.

Any of the outputs 604, 605, 609, 611, 614, 615, 616, and 617 are stored in the geophysical database 601 and may be repeatedly retrieved and updated by iteratively running the above-described processing sequence.

In particular and corresponding to a preferred embodiment, aimed at getting a detailed and robust version of the time shift volume 609, the method involves iterating the time shift estimation using the following steps 1. starting with strongly smoothed versions of the dip attribute as input;
2. estimate the time shift and stretch the seismic PS volume accordingly;
3. recalculate the dip attribute (necessary for both PP and PS seismic if spectral equalization is applied);
4. apply a less severe smoothing;
5. estimate an updated version of the time shift and stretch the seismic PS volume accordingly;
6. calculate a strongly smoothed version of the envelope attribute;
7. estimate an updated version of the time shift and stretch the seismic PS volume accordingly;
8. calculate a slightly smoothed version of the envelope attribute;
9. estimate an updated version of the time shift and stretch the seismic PS volume accordingly;
10. calculate the unfiltered envelope attribute;
11. estimate an updated version of the time shift and stretch the seismic PS volume accordingly;
12. smooth both the PP and pre-stretched PS seismic volume;
13. estimate an updated version of the time shift and stretch the seismic PS volume accordingly;
14. smooth both the PP and pre-stretched PS seismic volume yet less severely;
15. estimate an updated version of the time shift and stretch the seismic PS volume accordingly; and
16. estimate an updated version of the time shift using unsmoothed versions of the PP and pre-stretched PS seismic volumes.

The final versions of the time-shift estimate and the stretched PS seismic volumes are stored in the geological database 601 while the intermediate versions may be deleted.

Figure 7:
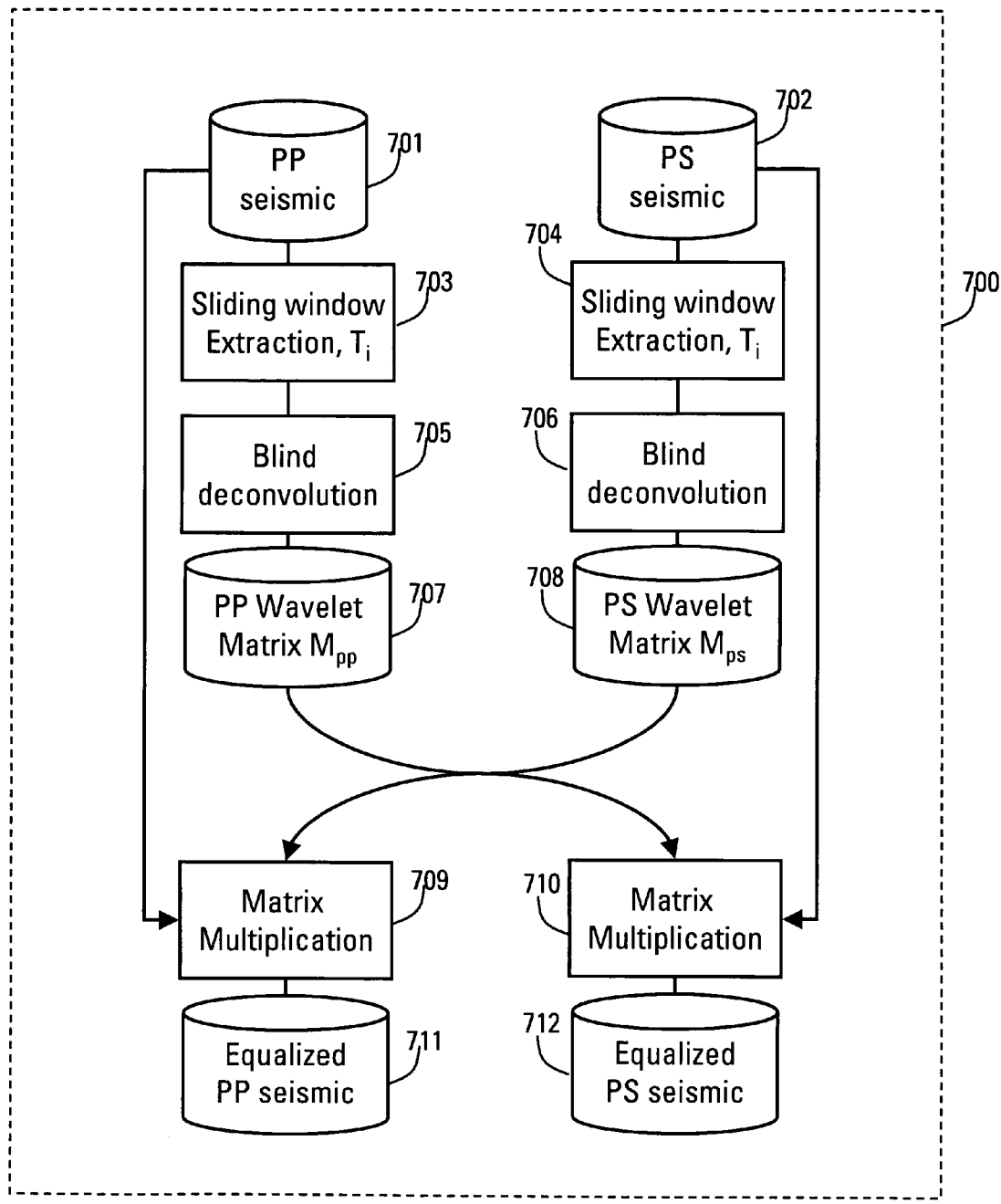
FIG. 7 is a detailed diagram illustrating the implementation of an equalization process for multi-component seismic data.

Now referring to FIG. 7, the details of a preferred embodiment to perform a spectral equalization 700 (block 603 of FIG. 6) are given. Input to the process are the PP, 701 (619 with reference to FIG. 6), and PS, 702 (618 with reference to FIG. 6), seismic volumes, where the PS seismic is pre-stretched according to a constant vp–vs ratio or using an intermediate time shift volume 609. As those acquainted with the art recognize, the spectral (or frequency) band of the seismic volumes changes with time (corresponding to the depth dimension) and does so differently for the PP and PS wave mode. Hence, the first part of the equalization is to estimate the time varying spectra (or wavelets) of the seismic volumes.

Figure 8:
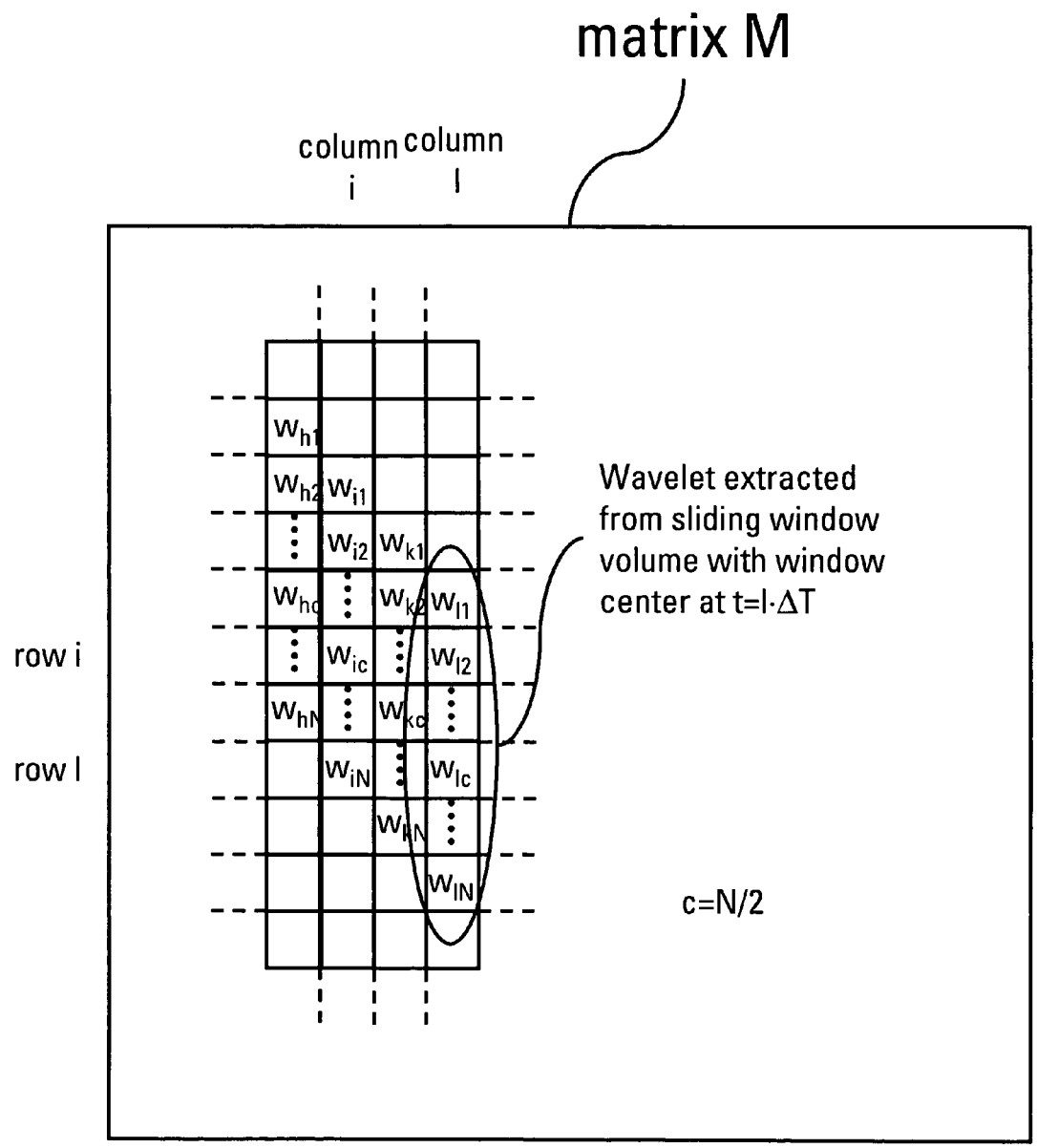
FIG. 8 shows the structure of the equalization matrix used in the process shown in FIG. 7.

According to a preferred embodiment, this is done by employing a sliding window technique, i.e. iteratively extracting seismic sub-volumes, 703 and 704, preferably covering the whole lateral extent and with a vertical extent corresponding to the window length (of typically 400 ms), and the center of consecutive windows differing by one or a few samples (typically 4 ms to 40 ms). Each subvolume, 703 respectively 704, is subjected to a process of blind deconvolution, 705 and 706 respectively, details of which are generally described in Kaaresen et al (see Kaaresen, K. and Taxt, T., 1998, Multichannel blind deconvolution of seismic signals: Geophysics, Soc. of Expl. Geophys., 63, 2093–2107). The process of blind deconvolution models a seismic volume, s(t,x,y), as the following convolution equation:

$$s(t,x,y)=w(t)*r(t,x,y)+n(t,t,x,y)$$

where * denotes the convolution operator and w(t) corresponds to the seismic source wavelet, r(t,x,y) to the reflectivity volume and n(t,x,y) to a noise term. Blind deconvolution will result in an estimate of both r(t,x,y) and the wavelet w(t). The wavelet, which typically has a support region of 100 ms–160 ms and corresponds to the survey system response subjected to frequency (or time) dependent attenuation will be stored in a quadratic matrix M, 707 and 708 respectively, having a structure as displayed in FIG. 8. Each column of the matrix contains the wavelet estimated from a sliding subvolume. Within a column, the center of the wavelet is placed at the position of the center of the subvolume within the total seismic input volume. In case the centers of consecutive sliding window subvolumes are more than one sample apart, the missing columns may be found by interpolation.

Continuing the scheme 700 in FIG. 7 the spectral equalization is performed by multiplying each column of the PP seismic volume 701 with the matrix Mps, 708, resulting in an equalized PP seismic volume 711. Accordingly, each column of the PS seismic volume 702 is multiplied with the matrix Mpp, 707 resulting in an equalized PS seismic volume 712.

Studying the details of the above described preferred embodiment it becomes apparent that the spectral equalization will be only approximate at the start when the time shift estimate is of suboptimal quality, but will enhance as the time shift estimate improves with each iteration of scheme 600 in FIG. 6.

Though the method for blind deconvolution described in Kaaresen et al. is included in one preferred embodiment of the invention, other methods for solving the blind deconvolution problem may implemented or yet in another embodiment of the invention other techniques for estimating the time-varying spectra of the seismic PP and PS volumes may be implemented.

Next the details for a preferred embodiment for the time shift estimation (block 608 with reference to FIG. 6) are given. Preferably, the following quantities are calculated in an iterative manner:

$$T_i(t,x,y) = T_{i-1}(t,x,y) + \Delta T_i(t,x,y)$$

$$\Delta T_i(t,x,y) = \frac{g_{t,i}(t,x,y) \cdot \Delta g_i(t,x,y) + \beta \cdot (\overline{T}_{i-1}(t,x,y) - T_{i-1}(t,x,y))}{\alpha + \beta + g_{t,i}(t,x,y) \cdot g_{t,i}(t,x,y)}$$

Here, Ti(t,x,y) is the estimated time shift at iteration i for a sample t of a trace with the lateral position indices x and y. ΔTi(t,x,y) indicates the time shift estimation increment and $$\overline{T}_{i-1}(t,x,y) = \sum_{\xi=-2}^{2} T_{i-1}(t+\xi, x, y)$$

is the local average time shift of the trace with the lateral position indices x and y. Furthermore, $g_{t,i}(t,x,y)$, is the average derivative along the time dimension (trace direction) at sample t for the trace with the lateral position indices x and y at iteration i, given by:

$$g_{t,i}(t,x,y) = \frac{1}{2}\left(\frac{\partial}{\partial t}s_{PP}(t,x,y) + \frac{\partial}{\partial t}s_{PS,stretched,i}(t,x,y)\right)$$

where $s_{PP}(t,x,y)$ is a trace from the PP input volume and $s_{PS,stretched,i}(t,x,y)$ is the preliminary stretched version of the corresponding trace from the PS input volume at iteration i. The latter quantity is obtained by translating the samples of $s_{PS}(t,x,y)$ an amount given by time shift estimate of iteration i−1:

$$s_{PS,stretched,i}(t,x,y) = \Im\{s_{PS}(t+T_i(t,x,y),x,y)\}$$

where $\Im$ denotes an interpolation operator. Interpolation is necessary because time shift values are allowed to be fractions of a sample size ΔT, in which case it is not possible to merely translate a signal sample through shifting sample indices. Instead, the trace signal is represented by an analytical (continuous) model, which can be translated to an arbitrary position and then again resampled to its original sampling rate. Those skilled with the art will recognize that such an interpolation operator can be linear or have some higher order.

At the first iteration, the time shift is initialized as $T_0(t,x,y)$ corresponding to the time shift estimation result (609 of FIG. 6) of another pair of input volumes or corresponding to a constant vp-vs ratio, which is found by a scanning technique. The latter technique is presented below. Further, the derivative $$\frac{\partial}{\partial t}$$

can be implemented using a finite difference or higher order schemes, the latter being less prone to noise. The residual signal $\Delta g_i(t,x,y)$ at iteration i, is obtained by:

$$\Delta g_i(t,x,y) = s_{PS,stretched,i}(t,x,y) - s_{PP}(t,x,y)$$

Finally, α and β are parameter controlling the smoothness of the time shift estimate. An appropriate choice of these parameters will lead to a robust estimation result. If the input seismic amplitudes are normalized between −1 and 1, desirable a values will typically be between 0 and 1 and preferably 0.2, and desirable β values will typically range between 0 and 8 and preferably 3.

The above described iteration scheme will be run for a fixed number of iterations or until the time shift increment drops below a threshold set by a user of the invention.

Variations of the above-presented time shift estimation scheme can be found in literature see e.g. (Memin, E.; Perez, P., "Dense estimation and object-based segmentation of the optical flow with robust techniques", IEEE Transactions on Image Processing, 1998, Vol 7, pp 703–719) and can be adapted to comply with the present invention. In particular, approaches performing warping of the trace signal such as the method employed Fomel can be used as alternative approaches to implement block 608 of FIG. 6.

Yet another approach and preferred embodiment of the current invention may use a Bayesian framework. In particular the following convolutional model:

$$s_{PP}(t,x,y) = w(t) * s_{PS}(t+T(t,x,y)) + n_g(t,x,y)$$

where $s_{PP}(t,x,y)$ and $s_{PS}(t,x,y)$ correspond to the input volumes (at their different processing stages i.e. subsampled or full volume, smoothed or non-smoothed, pure seismic or seismic attribute), w(t) is an equalization filter preferably derived as a Wiener filter from wavelets estimated by blind deconvolution from $s_{PP}(t,x,y)$ and $s_{PS}(t,x,y)$ as detailed in FIG. 7. T(t,x,y) is again the time shift necessary to stretch the PS volume to PP time and $n_g(t,x,y)$ is a noise term. Modeling $s_{PP}(t,x,y)$, $s_{PS}(t,x,y)$, T(t,x,y) as well as $n_g(t,x,y)$ as 3D Gaussian fields with given or unknown covariance matrices the probability for T(t,x,y) when $s_{PP}(t,x,y)$ and $s_{PS}(t,x,y)$ are observed can be written as:

$$f(T|s_{PP},s_{PS}) \propto N(s(t+T(t,x,y),x,y)*w(t),\Sigma_{PP}) \cdot N(0,\Sigma_{PS}) \cdot N(\mu_T,\Sigma_T)$$

where $N(\mu,\Sigma)$ signifies a multi-dimensional Gaussian distribution with a mean value μ and covariance matrix Σ. Hence, μT is the prior mean for the time shift and ΣT is its prior covariance matrix. Correspondingly, $\Sigma_{PP}$ and $\Sigma_{PS}$ are the prior covariance matrices for the input PP and PS volumes. The above distribution can be implemented using Markov Chain Monte Carlo method. Further details of such an implementation are omitted, since this solution at the current state of the art is computationally too expensive to compete with the deterministic approach described in detail above.

Figure 9:
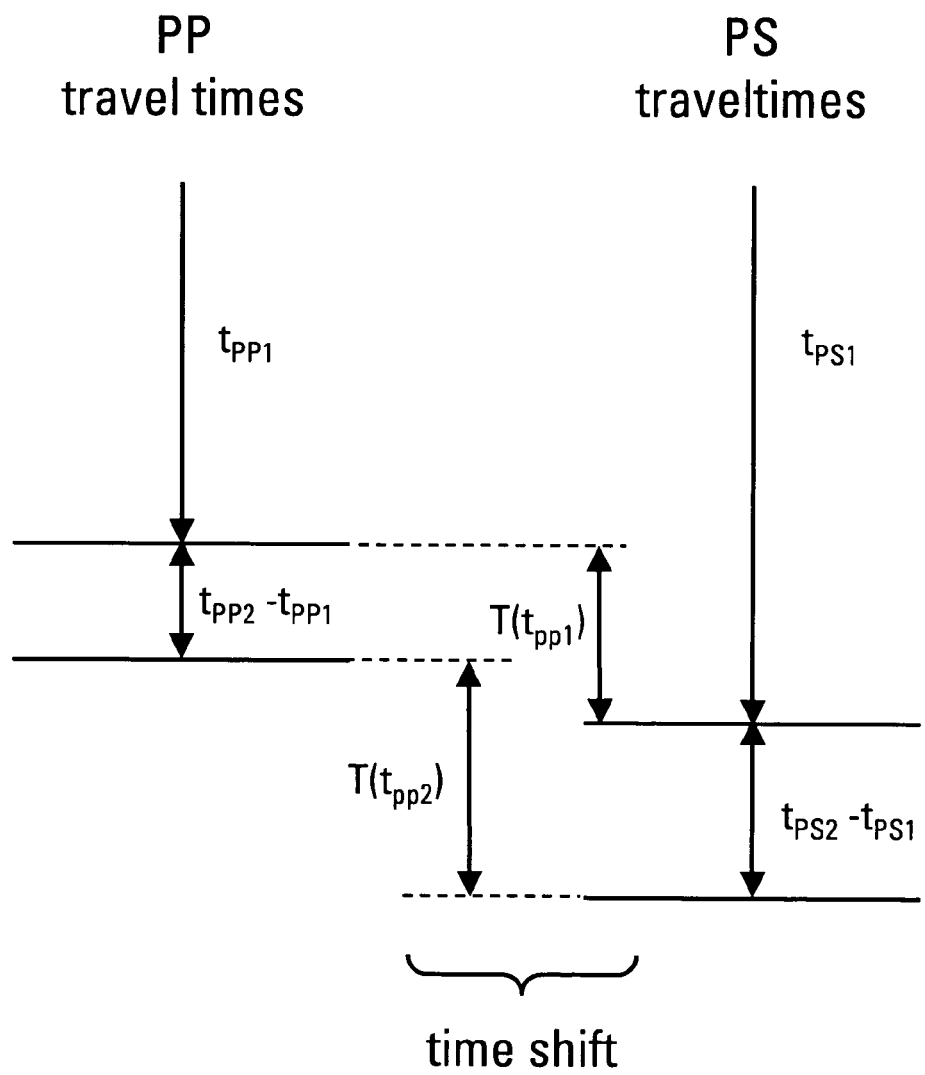
FIG. 9 illustrates relationships between variables in algorithms that may be used to invert an estimated time shift volume into $v_p$–$v_s$ ratios.

Next a preferred embodiment to invert the estimated time shift volume into $v_p$–$v_s$ ratio is described. With reference to FIG. 9, the zero offset two-way travel time for a PP wave propagating to the top of a layer with constant thickness d is denoted $t_{PP}1$. Further, the zero offset two-way travel time for a PP wave propagating to the bottom of said layer is denoted given by $t_{PP}2$ and consequently the two-way time for a PP wave propagating through said layer is:

$$t_{PP2} - t_{PP1} = \frac{d}{v_p} + \frac{d}{v_p}.$$

Correspondingly, the zero offset two-way travel time for a PS wave to reach the top of said layer is denoted $t_{PS}1$ and the zero offset two-way travel time for a PS wave to reach the bottom of said layer is denoted $t_{PS}1$ and consequently the two-way time for a PS wave propagating through said layer is:

$$t_{PS2} - t_{PS1} = \frac{d}{v_p} + \frac{d}{v_s}$$

Substituting the variable d for the thickness in the two equations above leads to the following formula for the $v_p$–$v_s$ ratio:

$$\frac{v_p}{v_s} = \frac{2(t_{PS2} - t_{PS1}) - (t_{PP2} - t_{PP1})}{(t_{PP2} - t_{PP1})}$$
$$= 1 + 2\frac{(t_{PS2} - t_{PP2}) - (t_{PS1} - t_{PP1})}{(t_{PP2} - t_{PP1})}.$$

The estimated time shift T measures the difference between the zero offset traveltime of corresponding PP and PS events, i.e.:

$$T(t_{pp1}) = t_{PS1} - t_{PP1} \text{ and } T(t_{pp2}) = t_{PS2} - t_{PP2}.$$

Inserting this relationship into the formula for the $v_p$–$v_s$ ratio gives:

$$\frac{v_p}{v_s} = 1 + 2\frac{T(t_{PP2}) - T(t_{PP1})}{(t_{PP2} - t_{PP1})}$$

and in the limit when the thickness of the layer becomes infinitesimally small:

$$\frac{v_p}{v_s} = 1 + 2\frac{\partial T(t_{PP})}{\partial t_{PP}}.$$

Consequently, in a preferred embodiment for inverting the time shift volume into a $v_p$–$v_s$ ratio volume the above formula is implemented and executed for each trace of the estimated time shift volume. Further, the derivative $$\frac{\partial}{\partial t_{PP}}$$

can be implemented using a finite difference (i.e. the second last formula for the $v_p$–$v_s$ ratio) or higher order schemes, the latter being less prone to noise.

Returning to the time shift estimation (block 609 of FIG. 6), in order to start the very first iteration often an initial guess for the time shift is beneficial or even necessary to guide the process to a robust estimation result. In a first preferred embodiment, this initial time shift guess is found by assuming a constant $v_p$–$v_s$ ratio of 3. Inverting the above formula for the $v_p$–$v_s$ ratio leads to an initial guess for the time shift:

$$\frac{v_p}{v_s} = 3 = 1 + 2\frac{\partial T(t_{PP})}{\partial t_{PP}} \Leftrightarrow \frac{\partial T(t_{PP})}{\partial t_{PP}} = 1 \Leftrightarrow T(t_{PP}) = t_{PP}.$$

Figure 10:
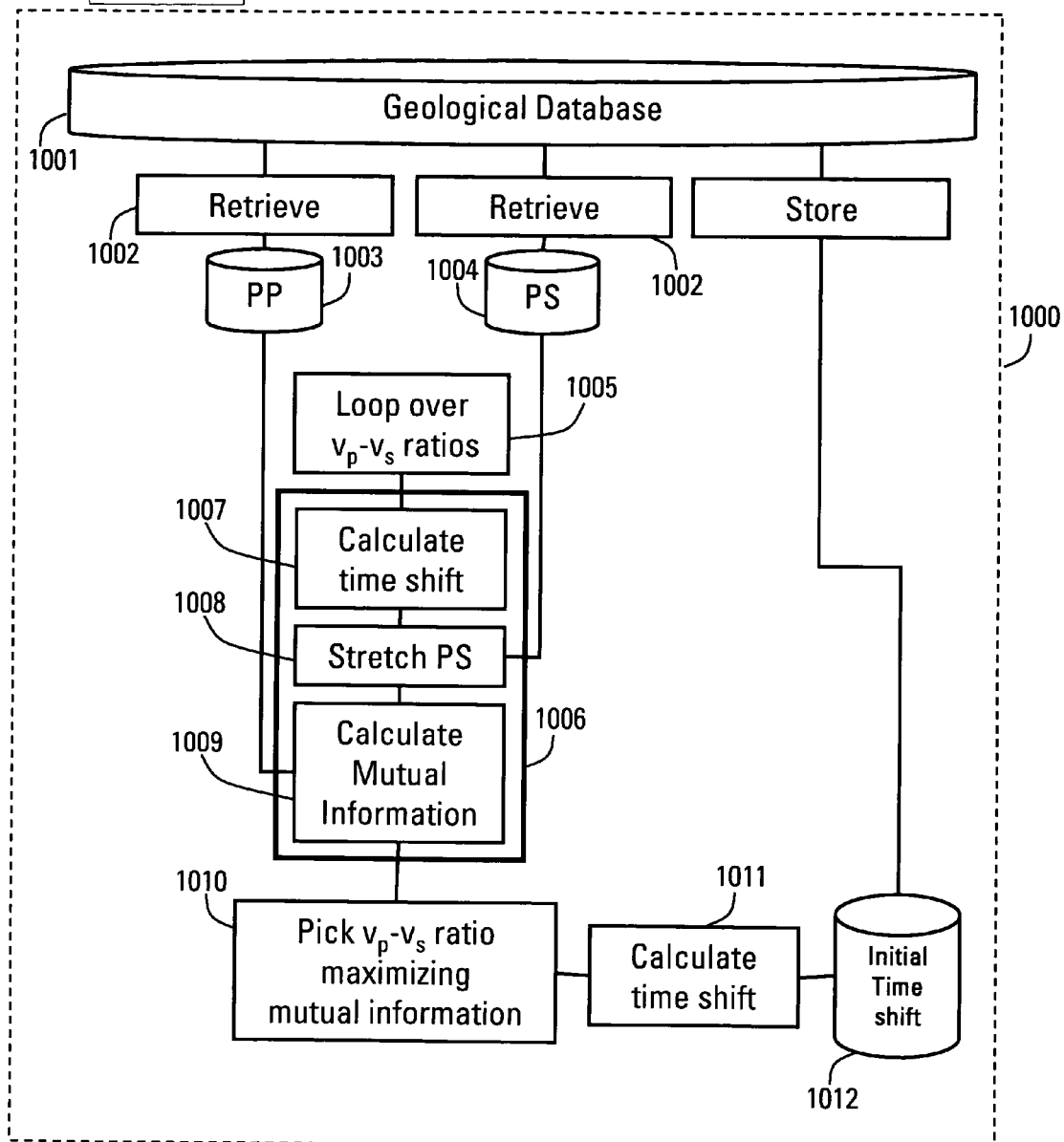
FIG. 10 shows a flow diagram of steps associated with the implementation of a scanning process for estimating optimal constant $v_p$–$v_s$ ratios.

In another preferred embodiment, an optimal constant $v_p$–$v_s$ ratio is estimated by the implementation of a scanning process 1000 detailed in FIG. 10. Said process consists of retrieving 1002 a PP seismic data (sub-)volume 1003 and its corresponding PS seismic data (sub-)volume 1004. Here, it is to be understood that the PP and PS seismic data volumes can represent corresponding subsampled, subdivided, or complete volumes, smoothed or full bandwidth versions of the original seismic signal, or derived attributes. The original seismic volumes are thus the possible versions produced by the processing sequence detailed in FIGS. 4A, 4B, and 4C and the subsampled, subdivided, smoothed and attribute derived versions can be any of the output 614, 615, 616, 617, 618, and 619 referred to in FIG. 6.

After retrieving the volumes a loop 1005 scanning over $v_p$–$v_s$ ratios is initiated. Preferably a $v_p$–$v_s$ ratio interval from 1.5 to 5.5 is scanned with an increment of 0.05. For each value of the $v_p$–$v_s$ ratio the sequence 1006 of processing steps are executed. The processing steps comprise calculating the time shift for the chosen $v_p$–$v_s$ ratio value by implementing the formula $$T(t_{PP}) = \frac{1}{2}\left(\frac{v_p}{v_s} - 1\right)t_{PP},$$

apply the time shift to the PS volume and stretch it accordingly 1008, and calculate a figure of merit called mutual information 1009. Mutual information of two corresponding data sets $s_1(t,x,y)$ and $s_2(t,x,y)$ is defined as $$MI = H[p(s_1)] + H[p(s_2)] - H[p(s_1,s_2)].$$

where H(p) is the entropy of a probability distribution p and is defined as:

$$H[p] = -\int p \cdot \log(p) \partial p$$

and $p(s_1)$ and $p(s_2)$ are the probability distributions of the data sets $s_1(t,x,y)$ and $s_2(t,x,y)$, respectively, and $p(s_1,s_2)$ is the joint probability distribution. The (joint) probability distributions can be estimated by implementing state of the art histogram techniques.

After termination of loop 1006, the $v_p$–$v_s$ ratio maximizing the value of mutual information is picked 1010 and used to calculate 1011 the initial time shift 1012 using the above formula. Finally the initial time shift is stored in the geological database 1001.

In yet another preferred embodiment, the initial time shift can be obtained from a (possibly time varying) $v_p$–$v_s$ ratio logged in one or several wells located within or close to the survey area. For this purpose the $v_p$–$v_s$ ratio logs have to be converted to time, possibly smoothed, and finally converted to the time shift by implementing:

$$T(t_{PP}) = \frac{1}{2}\int_0^{T_{max}} \left(\frac{v_p}{v_s}(t_{PP}) - 1\right)\partial t_{PP}.$$

Using any of the above described methods or yet other variations will provide initial guesses in order to start a more detailed time shift estimation process as described above.

Figure 11:
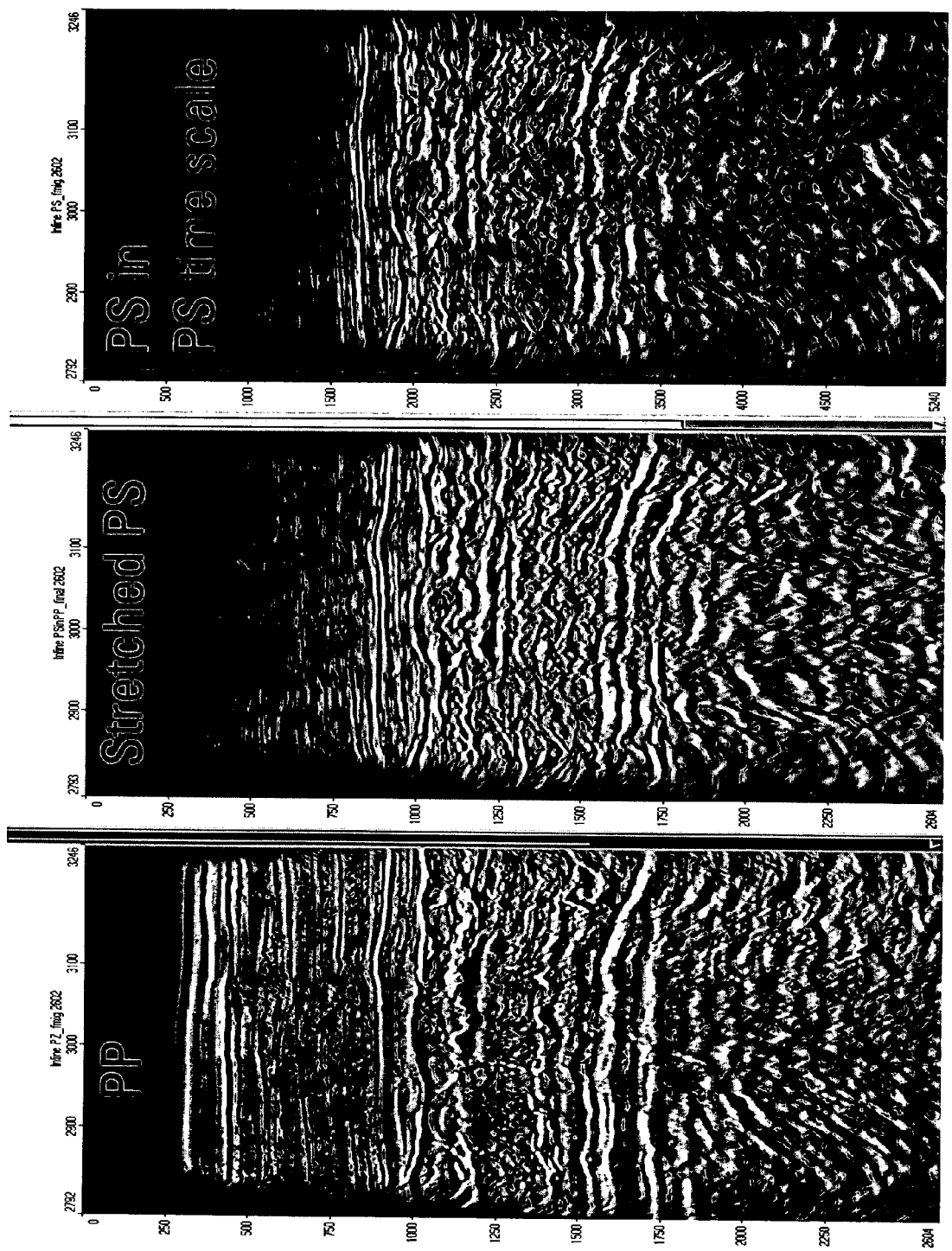
FIG. 11 displays an example PP section, a corresponding stretched PS section, and a PS section in PS time scale.
Figure 12:
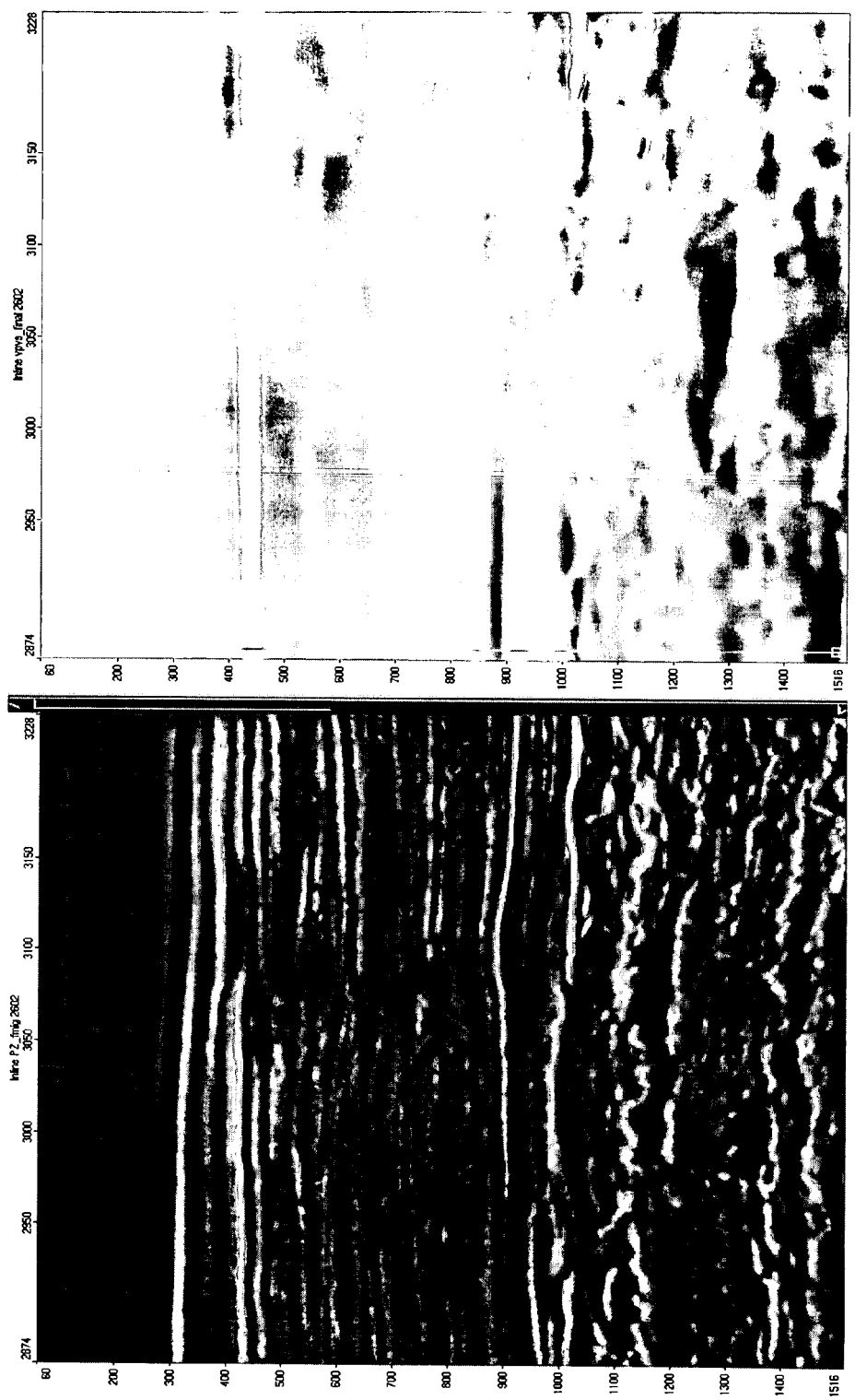
FIG. 12 displays the PP section from FIG. 11 and the corresponding $v_p$–$v_s$ ratio section.

Finally, the estimated $v_p$–$v_s$ ratio, the finally stretched PS seismic data as well as the PP seismic can be retrieved from the geological database and displayed side by side as sections or entire volumes using a 2D or 3D rendering and display unit. As an example of processing results obtained using a preferred embodiment of the present invention FIG. 11 shows a PP section with its corresponding stretched PS section compared to the corresponding PS section in PS time scale, whereas FIG. 12 shows the same PP section with the corresponding $v_p$–$v_s$ ratio section. To those trained in the art it is clear that properly stretched PS seismic volumes are of great value for the task of joint interpretation of a multi-component data set. Furthermore, it is commonly known that the $v_p$–$v_s$ ratio often is characteristic for reservoir lithologies and their fluid content. Therefore, it will be beneficial to apply operations such as thresholding, volume-growing, segmentation and classification processes on the $v_p$–$v_s$ ratio volume alone or in combination with other attributes derived from the PP or PS seismic.

The foregoing descriptions of preferred and alternate embodiments of the present invention have been presented for purposes of illustration and description. They are not intended to be exhaustive or to limit the invention to the precise examples described. Many modifications and variations will be apparent to those skilled in the art. For instance, instead of using data volumes where the vertical (depth) axis of the image volume is denoted in recording time, depth migrated volumes or attributes derived from depth migrated volumes may be used which will result in a shift estimate measured in distance rather than time. Although computationally more intensive, this will typically produce a better match between the volumes or attributes and the shift estimate could be used to update the migration velocity model. The described embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

I claim:

1. A method of correlating seismic events associated with different types of seismic transmission modes, comprising:
   calculating a shift estimate between a first set of seismic events or attributes associated with said seismic events attributable to one type of transmission mode and a second set of seismic events or attributes associated with said seismic events attributable to a different type of transmission mode using a smoothed version of at least one of said sets of seismic events or attributes associated with said seismic events, and
   updating said shift estimate using a less severely smoothed or unsmoothed version of said at least one set of seismic events or attributes associated with said seismic events.

2. A method in accordance with claim 1, wherein the first set comprises a migrated and stacked PP seismic data volume and the second set comprises a corresponding migrated and stacked PS seismic data volume.

3. A method in accordance with claim 1, wherein the first set comprises a migrated single offset prestack seismic volume generated from PP data and the second set comprises a migrated single offset prestack seismic volume from corresponding PS data.

4. A method in accordance with claim 1, wherein the first set comprises a weighted sum of migrated PP common offset sections and the second set comprises a weighted sum of migrated PS common offset sections and where said weights are chosen, respectively, so that stacks of said PP and PS common offset sections correlate better in amplitude when subjected to time shift estimation.

5. A method in accordance with claim 1, wherein the first set comprises a gradient cube resulting from a two or three term intercept and gradient AVO inversion of PP seismic data and the second set comprises a migrated and stacked PS common offset seismic data volume.

6. A method in accordance with claim 1, wherein the first set comprises a weighted sum of migrated offset sections from a towed streamer survey over an area and the second set comprises a weighted sum of migrated PS common offset sections generated from data obtained during a multi-component survey of the area.

7. A method in accordance with claim 1, wherein the first set comprises migrated and stacked sections of a PS data volume corresponding to fast shear wave mode and the second set comprises migrated and stacked sections of the PS data volume corresponding to slow shear wave mode.

8. A method in accordance with claim 1, further comprising deriving an initial shift estimate by interpolating well log information.

9. A method in accordance with claim 1, further comprising deriving an initial shift estimate from a constant $v_p$–$v_s$ ratio.

10. A method in accordance with claim 9, wherein said constant $v_p$–$v_s$ ratio is provided by a user of a computer system implementing the method.

11. A method in accordance with claim 9 where the constant $v_p$–$v_s$ ratio is provided by a scanning procedure where:
   the $v_p$–$v_s$ ration is scanned over an interval from 1.5 to 5.5, and
   for each $v_p$–$v_s$ ratio a time shift is calculated according to the formula $$T(t_{PP}) = \frac{1}{2}\left(\frac{v_p}{v_s} - 1\right)t_{PP}$$

and the PS seismic volume or an attribute volume derived from the PS seismic volume is stretched accordingly with the time shift volume information,
   and the mutual information is calculated between said stretched PS/attribute volume and the corresponding PZ seismic or attribute volume,
   and the $v_p$–$v_s$ ratio producing the maximum of mutual information is used as const $v_p$–$v_s$ ratio.

12. A method in accordance with claim 11 where the procedure is carried out using a sliding window technique that allows the initial $v_p$–$v_s$ ratio to vary with time (depth).

13. A method in accordance with claim 1, wherein said updated shift estimate is used to stretch the PP section to PS time rather than stretching the PS section to PP time.

14. A method in accordance with claim 1, wherein said updated shift estimate is used to calculate $v_p$–$v_s$ ratios and said $v_p$–$v_s$ ratios are used to detect and map reservoir anomalies.

15. A method in accordance with claim 1, wherein said updated shift estimate is used to calculate $v_p$–$v_s$ ratios and said $v_p$–$v_s$ ratios are combined with other attributes in order to segment or classify the subsurface.

16. A method in accordance with claim 1, wherein said updated shift estimate is used to calculate $v_p$–$v_s$ ratios and said $v_p$–$v_s$ ratios are used as trend model for an elastic impedance inversion.

17. A method in accordance with claim 1, wherein said first set and said second set are depth migrated volumes or attributes derived from depth migrated volumes and said shift estimate is measured in distance rather than time.

18. A computer system for processing and interpreting seismic data, comprising:
 (a) means for calculating a shift estimate between a first set of seismic events or attributes associated with said seismic events attributable to one type of transmission mode and a second set of seismic events or attributes associated with said seismic events attributable to a different type of transmission mode using a smoothed version of at least one of said sets of seismic events or attributes associated with said seismic events; and
 (b) means for updating said shift estimate using a less severely smoothed or unsmoothed version of said at least one set of seismic events or attributes associated with said seismic events.

19. A computer program product for processing and interpreting seismic data, comprising:
 a computer useable medium having computer readable program code embodied in said medium for processing seismic data, said computer program product having:
 (a) computer readable program code means for calculating a shift estimate between a first set of seismic events or attributes associated with said seismic events attributable to one type of transmission mode and a second set of seismic events or attributes associated with said seismic events attributable to a different type of transmission mode using a smoothed version of at least one of said sets of seismic events or attributes associated with said seismic events; and
 (b) computer readable program code means for updating said shift estimate using less severely smoothed or unsmoothed versions of said sets of seismic events.

* * * * *